Nov. 17, 1936.                    E. B. PHILIPS                    2,061,169
                                   SLUICE GATE
                             Filed Sept. 12, 1932              2 Sheets-Sheet 1

INVENTOR.
Erwin B. Philips.
BY
ATTORNEYS

Nov. 17, 1936.  E. B. PHILIPS  2,061,169
SLUICE GATE
Filed Sept. 12, 1932  2 Sheets-Sheet 2
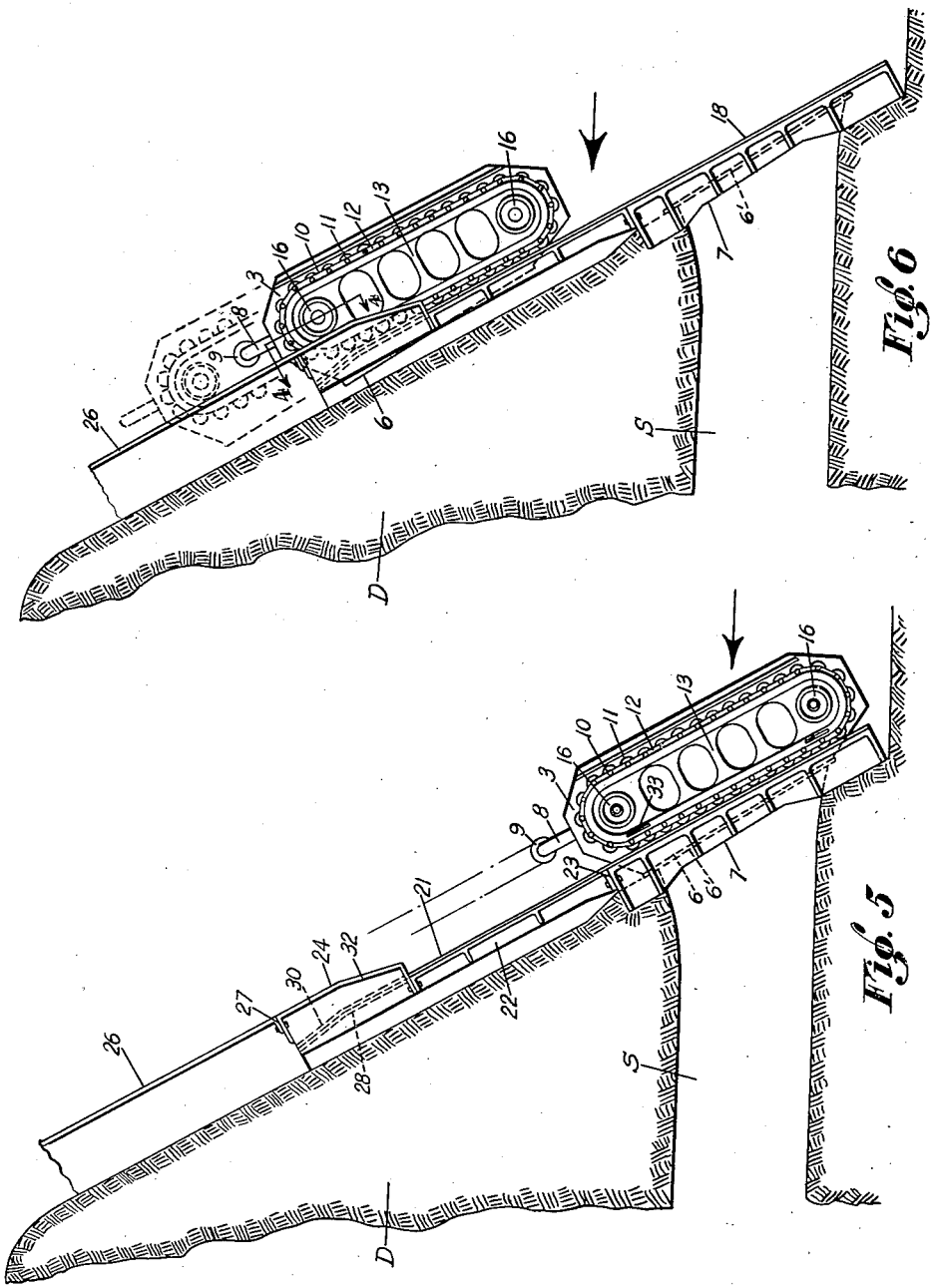
INVENTOR.
Erwin B. Philips.
BY
ATTORNEYS.

UNITED STATES PATENT OFFICE 2,061,169

SLUICE GATE

Erwin B. Philips, Kenton, Ohio, assignor to Philips & Davies, Inc., Kenton, Ohio, a corporation of Ohio Application September 12, 1932, Serial No. 632,672

2 Claims. (Cl. 61—28)

My invention relates to sluice gates. It has to do more particularly with that type of sluice gate which is designed for use under water and which may be installed at comparatively great depths. It is especially applicable to the installation of sluice gates in dams wherein the gate must travel along an inclined slope in its approach to or departure from its closed position, though it is not necessarily limited thereto. It is especially desirable in conjunction with sluice gates which operate upon the upstream side of a dam.

Gates of this type are ordinarily provided with anti-friction rollers or other anti-friction means to facilitate the actual opening and closing of the gate. From the moment that the gate starts to close the sluiceway, until this sluiceway is substantially closed, the kinetic force of the water becomes a factor of great importance. It exerts a pressure upon the upstream side of the gate and this pressure is in turn transmitted to the anti-friction rollers or other anti-friction means.

When the closing operation is at a comparatively great depth, the kinetic force of the water is immense and, in some cases, the water is passing through the sluiceway and against the gate at sixty miles per hour or more. Also, when the gate is closed, the hydrostatic pressure of the water thereon is frequently as great as four million pounds or more.

It is obvious that the anti-friction rollers or other means which are provided for minimizing the friction during actual closing or opening must be very highly finished and very accurate in diameter. This is particularly true, since it is not practicable to use rubber or other resilient sealing means with gates of this type, especially when they are used at a substantial depth below the surface of the pond. The ideal type of seal is a metal-to-metal contact between the sealing face of the gate and the sealing face of the gate frame surrounding the sluiceway opening.

In order to obtain this metal-to-metal contact as indicated, the anti-friction rollers must cooperate, during the closing and opening of the gate, with highly finished and accurate tracks which will be effective to keep an absolutely parallel position between the sealing plane of the gate frame and the sealing plane of the gate so that a water-tight seal will be produced. Moreover, this cooperation must be maintained at as high a state of perfection as possible in order to insure the maintenance of this parallel relation.

It will also be obvious that the maintenance of these anti-friction means at a high state of perfection is important in connection with their functions in minimizing the friction induced by the pressure of the water column upon the gate during the closing or opening operation. Injury to these anti-friction means might conceivably prevent the closing of the gate, with a consequent loss of the entire water supply of a city or other project for which the dam is provided. Such inability to close the gate has often resulted in enormous damage to the dam and its equipment.

The type of gate with which this invention is preferably utilized is illustrated in the patent to Broome 1,306,370 of June 10, 1919, wherein the gate is lowered into closing position by tension supporting members and wherein the skin plate of the gate is inclined to a calculated extent so that the customary column of water above the gate at the time of closing will be effective in conjunction with the weight of the gate to positively move the gate to its closed position. Also, the tracks for the anti-friction means are in such converging relation to the sealing plane of the gate that closing will be effected without sliding friction.

With this type of gate, it has been found possible to utilize one gate for a series of sluiceways in the dam, the gate being lifted to the top of the dam by a traveling hoist and transferred to a position above any one of such series of sluiceways. Where the gate is used as an emergency gate, it is kept at the top of the dam until such emergency arises. When the emergency does arise, however, the lowering of the gate into its closing position must ordinarily be effected quite rapidly. If, for example, the opening of the sluiceway is one hundred or more feet below the pond level, the problem of getting the gate to the position where it starts to close the sluiceway opening is a serious one.

If the anti-friction means are to be used for transporting the gate from the top of the dam along the inclined slope thereof to its approximate closing position, it is necessary that carefully finished tracks be provided for such anti-friction means at a comparatively great expense. Moreover, where the upper portions of the track are, from time to time, uncovered by the lowering of the water level, the accumulation of debris thereon becomes dry and hard, frequently being in the nature of barnacles or tubercles and offering a serious danger of injury to the anti-friction means.

The customary way of handling this problem is to build a tower projecting out into the pond on the upstream side of the dam, so that the gate need not follow the inclination of the slope of the dam but may be lowered vertically or raised vertically to and from the closing and opening zone. However, this practice usually involves a cost of many thousand dollars.

Furthermore, where endless roller chains are used as anti-friction means, these roller chains may weigh several thousand pounds. The rapid lowering of a gate for one hundred or more feet along a track at a comparatively high rate of speed, with these roller chains in constant contact with the track, will cause the travel of such chains at a rate of speed which is bound to be harmful to the anti-friction means and, in fact, to be a serious source of danger.

When a gate of this type is used in connection with a turbine intake, the gate may be frequently closed and opened. Often, the user of the gate considers it desirable to raise the gate to the top of the dam whenever it is opened, for the purpose of avoiding vibration of the gate by the moving waters and also to facilitate frequent inspection of the gate. If the roller chains are relied upon for the duty of transporting the gate to and from the closing zone, the wear and tear upon these roller chains is necessarily greatly increased with a consequently great increase in liability of damage thereto and with a consequently great shortening of the lives thereof. This greatly multiplies the danger of leakage and enhances the danger that the roller friction will become so great as to prevent closing of the gate under the pressure of the water column for which it has been calculated.

One of the objects of this invention is to provide a means whereby the anti-friction means which is used during the actual closing and opening of the gate may be preserved from injury so that it may perform the actual closing and opening operations with certainty and efficiency.

Another object of this invention is to provide a means for getting the gate to and from its closing and opening zone without subjecting the anti-friction means to the undesirable stresses previously explained.

Another object of this invention is to provide a means for bringing the anti-friction means of the gate into proper relation to the guides effective during the closing and opening operation with facility and without injury to such anti-friction means or such guides.

Another object of this invention is to provide a means for traveling a gate of the type indicated along an inclined slope, either in its downward or its upward movement, in such a manner that swaying of the gate will be avoided.

In its preferred form, my invention contemplates the provision of a means for transporting the gate from the top of the inclined slope of a dam to the opening and closing zone without the use of the anti-friction means provided for actual closing or opening. Moreover, my invention is such that the said transporting means will deliver the gate to the closing and opening zone and will, thereupon, automatically cease to function when the anti-friction means have assumed effective cooperation with their guides. Furthermore, my invention is such that the anti-friction means will function effectively during the opening of the gate and, after such opening, will automatically return the gate to the transporting means, simultaneously removing all stress from the anti-friction means.

More specifically, my invention contemplates the use of transporting tracks on the slope of the dam and gate supporting wheels mounted on the gate for cooperation with said tracks while the gate is in the transporting zone. These transporting tracks extend into such juxtaposition to the guides provided for cooperation with the anti-friction means that the lowering of the gate, with its wheels traveling on the transporting tracks, will ultimately result in bringing the anti-friction means into cooperative relation with their guides and in automatically transferring the weight of the gate from its transporting wheels to the anti-friction means. Likewise, the raising of the gate from its closed position will ultimately again bring the transporting wheels into position to support the gate upon the transporting track and will, immediately thereafter, relieve the anti-friction means from any stress whatever.

The preferred embodiment of my invention is shown in the accompanying drawings wherein similar characters of reference designate corresponding parts and wherein:

Figure 5 is a section taken through the dam and showing my sluice gate in side elevation, such gate being shown in closing position.

Figure 6 is a view similar to Figure 5 showing the gate in the positions where the roller trains leave their tracks during the upward movement of the gate and the wheels begin to operate on the wheel tracks.

Figure 1:
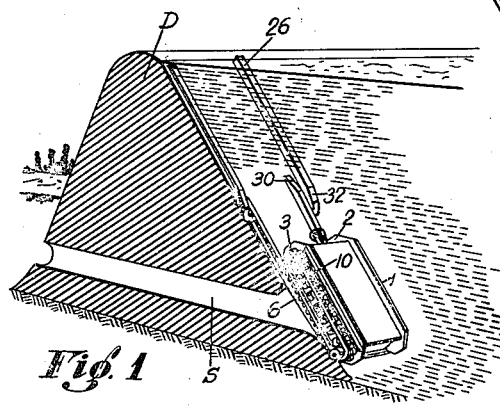
Figure 1 is a perspective view of a section of a dam having a sluice gate made in accordance with my invention applied thereto, such sluice gate being shown in closing position.

With reference to the drawings, I have shown my invention applied to the slope of a dam D. This dam is provided with a sluice-way S which is disposed below the water level and which is adapted to be closed by a sluice gate 1. This sluice gate 1 is of the submerged type so that the water pressure will supplement the force of gravity, to cause the closing movement of the gate, without exerting any downward pressure thereon by means of the gate operating mechanism.

The gate 1 may be of any desired type but as shown in the drawings this gate comprises the side plates 2 and 3 which are joined together by a plurality of cross beams 4 which are suitably secured thereto. The gate is further provided with a face plate 5 which is suitably secured thereon at the upstream side of the gate.

The downstream side of the gate is provided with inclined sealing planes 6 which are suitably formed thereon at each side thereof. These inclined sealing planes 6 are adapted to cooperate with the correspondingly inclined sealing planes 6' disposed on each side of the gate frame 7, which is disposed at the upstream end of the sluice-way S (Figures 5 and 6). When the gate is in its lowermost closing position the sealing planes 6 and 6' are adapted to firmly contact with each other to produce a water-tight seal. Furthermore, it will be apparent that since both the sealing plane 6 on the gate and the sealing plane 6' on the gate frame are inclined relative to the path of movement of the gate, the gate will leave its seat at once on beginning the opening movement. Likewise, the gate will not again engage its seat until the completion of the closing movement, so that sliding friction between the gate and the gate frame is eliminated.

The gate 1 is further provided with a pair of arms 8 extending from the upper end thereof and secured thereto in any suitable manner. These arms 8 have a pulley 9 rotatably mounted between the upper ends thereof. This pulley 9 may be suitably connected to a hoisting mechanism (not shown) arranged adjacent the top edge of the dam. This hoisting mechanism is adapted to move the gate 1 between its lowermost closing position and its uppermost position.

The gate is further provided at each side thereof with roller trains 10 which are suitably mounted thereon. As will be understood hereinafter these roller trains operate on tracks disposed adjacent the sluice-way and when the gate nears its closing position the roller trains 10 support the weight of the gate and the water pressure upon the gate. Furthermore, these roller trains cooperate with the roller train tracks in keeping the sealing planes 6 of the gate in parallel relation to the sealing planes 6' of the gate frame 7, so that sliding friction will be eliminated during the closing movement of the gate and so that the gate will firmly engage its seat at the end of the closing movement and a water-tight seal will be produced. However, it will be understood that other forms of anti-friction devices may be employed instead of the roller trains 10.

Figure 4:
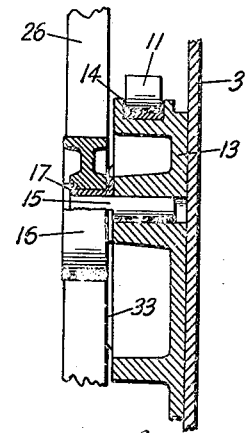
Figure 4 is an enlarged sectional view taken on line 4—4 of Figure 6, and showing one of the wheels and one of the guard members which prevent contact of the inner surface of the wheel tracks with the roller trains.

Each of these roller trains 10 comprises a series of rollers 11 which are connected together in a train by means of links 12. The rollers 11 are preferably of material which is highly resistant to corrosion. These rollers are also very highly machined and very accurate in diameter. A casting 13 is suitably secured to each side plate of the gate 1 and each of these castings preferably extends almost the entire length of the gate. Each of these castings is provided with a groove 14 (Figure 4) which extends around the entire periphery thereof. The roller trains 10 are adapted to bodily move around the castings 13 with the rollers 11 operating in the grooves 14.

Each of the castings 13 is further provided adjacent each end thereof with stub axles 15 projecting laterally therefrom. These stub axles 15 may be secured to the castings 13 in any suitable manner. The stub axles 15 have wheels 16 rotatably mounted thereon. These wheels 16 are provided with bronze bushings 17. The wheels may also be provided with suitable oiling means (not shown).

Figure 3:
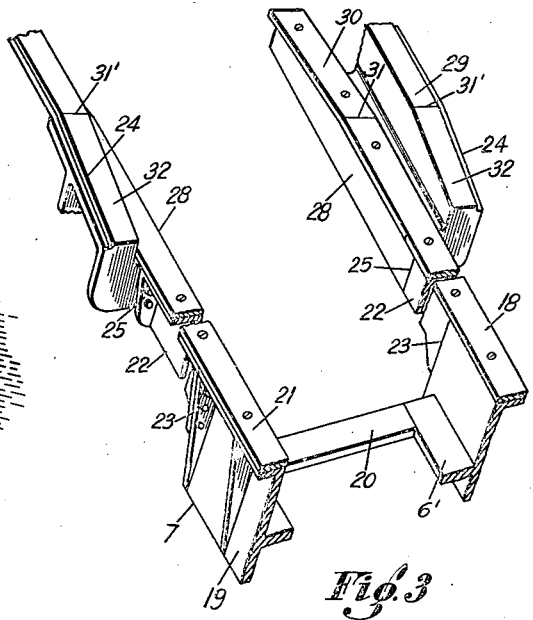
Figure 3 is a perspective view, in detail, of the transition members which are connected to the lower ends of the wheel tracks and the upper ends of the roller train tracks.

The roller trains 10 are adapted to operate on roller train tracks 18 when the gate 1 is near its closed position. The tracks 18 form a portion of the gate frame 7, as shown in the drawings, and these tracks may be suitably secured to the slope of the dam. With reference to Figure 3, each of these tracks 18 is shown as comprising a body portion 19, having one of the inclined sealing planes 6' of the gate frame formed on the inner side thereof. A top sealing member 20 and a bottom sealing member (not shown), which are adapted to cooperate with corresponding sealing members on the gate 1, are provided and are adapted to also serve as a rigid connection between the tracks 18.

The upper surfaces of the tracks 18 are provided with strips of material 21 which are suitably secured thereon. These strips of material 21 may be of a type which will resist corrosion. Furthermore, the surface of this material is highly machined so that the roller trains 10 may operate thereon without injury to the rollers and so that the gate will be properly seated on the gate frame when it moves into closed position. As shown in the drawings, the tracks 18 extend from a point above the sluice-way S to a point below said sluice-way.

The upper ends of the tracks 18 are bolted to roller train track portions 22 as at 23. Such track portions 22 are preferably of a length about equal to the length of the gate 1. Thus, the gate may be supported on the roller trains 10, which may occupy a position entirely on the track portions 22 before the actual closing operation of the gate begins. The upper ends of the track portions 22 are bolted to transition members 24, as at 25, which transition members have their upper ends connected to the lower ends of the wheel tracks 26 as at 27 (Figures 5 and 6). The strips of material 21 are extended over the track portions 22. The wheel tracks 26 extend from the transition members 24 to a point adjacent the upper edge of the dam. In the drawings, the wheel tracks 26 are shown as being only slightly longer than the entire roller train tracks but it will be understood that in practice the wheel tracks will be considerably longer than the roller train tracks, depending upon the height of the dam. These tracks 26 may be made of cast iron or of common steel bars or other inexpensive material. Furthermore, it is not necessary to machine the upper surface of these tracks inasmuch as the roller trains 10 do not operate thereon, as will be hereinafter understood.

The transition members 24 are provided for a purpose which will be hereinafter fully explained. Each of these members comprises an inner portion 28 and an outer portion 29. The inner portion 28 is of the same height as the tracks 18 and the track portions 22 so that the upper surface of the roller train tracks and the upper surface of the portions 28 are in line with each other. The strips of material 21 are extended over the portions 28, and as will be understood hereinafter, these portions 28 serve as roller train tracks. The portion 29 of the transition members 24 are of the same height as the wheel tracks 26 and are adapted to constitute a portion of such tracks.

The portions 28 of the transition members 24 are provided with inclined sections 30. These inclined sections 30 extend upwardly along the slope of the dam but are inclined downwardly from a point 31 to a point adjacent the upper ends of the portions 28. The portions 29 of the transition members 24 are also provided with inclined sections 32. These sections 32, however, extend downwardly along the slope of the dam and are also downwardly inclined from a point 31', as indicated in Figure 3 of the drawings. The point 31 may be in line with the point 31', although, as shown in Figure 3, the point 31 is preferably disposed slightly behind the point 31' for a purpose which will be hereinafter understood.

Figure 2:
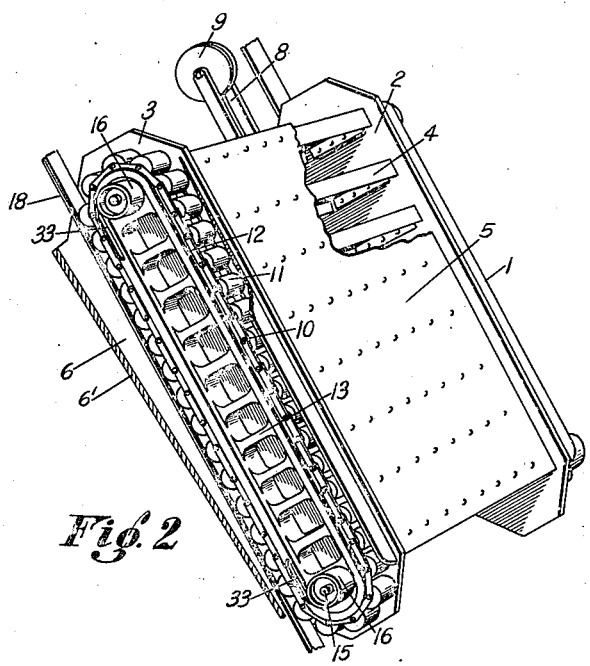
Figure 2 is a perspective view, partly broken away, of a gate which I may employ, showing the roller train and the wheels mounted on one side of the gate.

As shown in Figure 2, the gate 1 is further provided with guard members 33 which project outwardly from the castings 13 adjacent each end thereof. These guard members 33 are adapted to guide the gate 1 between the wheel tracks 26 when the gate is pulled upwardly from closed position towards the upper edge of the dam. As will be apparent hereinafter when the gate moves upwardly the guards 33 contact with the inner surfaces of the wheel tracks and guide the wheels 16 on such tracks. Furthermore, these guards prevent injury to the roller trains by contact of such trains with the inner surfaces of the wheel tracks.

In the operation of my sluice gate, assuming that the gate is in closed position, the sealing planes 6 on the gate and the sealing planes 6' of the gate frame 7 as well as the sealing planes on both ends of the gate and gate frame will be firmly in contact with each other closing the sluice-way S. In this position the rollers 11 of the roller trains 10 will be resting on the upper machined surface of the roller train tracks 18. In order to open the gate, the hoisting mechanism is operated to cause the gate 1 to be moved upwardly. In the initial upward movement of the gate the surfaces 6 and 6' will quickly move away from each other since they are inclined with relation to the path of movement of the gate. Furthermore, in this initial movement the roller trains 10 will operate on the tracks 18 and since the upper surfaces of these tracks are machined and may be made of material resistant to corrosion there will be no danger of injuring the roller trains. A portion of the gate will extend down between the roller train tracks so that there will be no danger of the gate running off of such tracks.

Continued upward movement of the gate 1 causes the upper ends of the roller trains to reach a position where the rollers will rest on the upper surfaces of the portions 28 of the transition members 24. At this point the wheels 16 at the upper end of the gate will occupy a position over the inclined portions 32 of the portions 29 of the transition members. Further movement of the gate causes the rollers to move along the portions 28 until they reach the point 31 where they will start down the incline 30. At this point the wheels 16 will have reached the upper ends of the inclined portions 32 and will be operating on the upper surfaces of the members 29 and will operate thereon until they reach the tracks 26. Since the point 31 is disposed above the point 31', this will insure that the upper end of the gate will be supported by the wheels 16 before the rollers 11 leave the roller train tracks. The guards 33 will contact with the inner surfaces of the portions 29 and later with the inner surfaces of the wheel tracks 26 and will guide the wheels on these tracks and also prevent contact of the inner surfaces of the portions 29 and the tracks 26 with the roller trains. As the gate moves further, the rollers will continue to leave the portion 28 until the wheels 16, on the lower end of the gate, reach the portion 29 and thereafter the weight of the gate will be supported on wheels 16, which will operate on the wheel tracks.

When it is desired to close the gate, the hoisting mechanism is operated to allow the gate to move downwardly. During the travel of the gate from its uppermost position towards its closing position, it will be supported on the wheels 16 which will operate on the tracks 26. The guards 33 will prevent contact between the inner surface of the tracks 26 and the roller trains.

When the gate moves downwardly to a point adjacent the transmission members 24, the rollers 11 at the lowermost end of the roller trains 10 will begin to move up the inclined sections 30 of the portions 28 and to reach the point 31 and begin to operate on the upper surfaces of the portions 28. Shortly thereafter the lowermost wheels 16 will reach the point 31' and will leave the portions 29 of the transition members 24. Since the point 31' is disposed below the point 31, the wheels 16 at the lower end of the gate will not leave the wheel tracks until after the rollers on the roller trains begin to operate on the roller train tracks. Thereafter, the rollers will operate on the roller tracks and the wheels 16 will be inoperative. After the gate has moved further, the uppermost wheels 16 will leave the wheel tracks and the entire weight of the gate will be supported on the roller trains which will thereafter operate on the roller train tracks.

Then the gate will move downwardly towards the frame 7. The roller trains and cooperating tracks will maintain the sealing planes 6 and 6' in parallel relation so that there will be no sliding friction generated between these planes during the actual closing movement of the gate. When the gate is in actual closed position, the sealing planes 6 and 6' will be firmly in contact with each other (Figure 5).

It will be understood from this that as the gate moves upwardly to a certain point adjacent the transition members, the wheels 16 on the upper end of the gate will move into contact with the wheel tracks and shortly thereafter the rollers on the upper end of the gate will begin to move out of contact with the roller tracks. In the lowering operation of the gate, the rollers at the lower end of the gate will begin operating on the roller tracks and the wheels 16 at the lower end of the gate will leave the wheel tracks an instant later.

Thus, it will be obvious that the roller trains merely come into operation when the gate nears its closing position, and during the greater portion of the time when the gate is being moved between its uppermost position and its lowermost closing position, the roller trains are inoperative. The result of this arrangement consists in the fact that the roller trains come into contact only with a highly machined surface for which they were designed and are not called upon to serve any other function than to prevent friction during the actual closing operation of the gate. All travel of the gate from its uppermost position to the gate frame is accomplished by the wheels operating on their tracks and thereby protecting the roller trains against any damage which might occur if the gate was called upon to travel by means of these roller trains.

Since the roller trains do not support the gate on the long sections of tracks between the upper edge of the dam and a point near the sluiceway, these tracks may be made of cast iron or common steel bars. Furthermore, these tracks need not be machined which is an expensive operation. Then, too, if any barnacles or other foreign matter collects on these tracks the roller trains will not be injured since the weight of the gate is supported by the wheels on the tracks.

The term "deep-water sluice gate", as used in the claims, is intended to refer to that type of sluice gate wherein the gate, when in closed position, closes the opening of a sluiceway whose upper edge is spaced below the water level.

Having thus described my invention, what I claim is:

1. In a sluice gate, wheels on said gate, roller trains on said gate, wheel tracks for cooperating with said wheels to guide the gate between open position and a position adjacent the sluice-way, roller train tracks for cooperating with said roller trains during the actual closing operation of the gate, members for connecting said wheel tracks to said roller train tracks, said members having a portion of said wheel tracks and a portion of said roller tracks formed thereon, said gate and said roller trains being adapted to pass between said wheel tracks, and guard members for holding said roller trains out of contact with the inner surfaces of said wheel tracks.

2. In a sluice gate, wheels on said gate, roller trains on said gate, inclined wheel tracks for cooperating with said wheels to guide the gate between open position and a position adjacent the sluice-way, inclined roller train tracks for cooperating with said roller trains during the actual closing operation of the gate, and transition members for connecting said inclined wheel tracks to said inclined roller train tracks, said transition members having a portion of said wheel tracks and a portion of said roller train tracks formed thereon.

ERWIN B. PHILIPS.